Patented Sept. 15, 1953

2,652,427

UNITED STATES PATENT OFFICE 2,652,427

PREPARATION OF SULFONATION PRODUCTS

Andrew Shultz, Jr., Buffalo, N. Y., assignor to Allied Chemical & Dye Corporation, New York, N. Y., a corporation of New York No Drawing. Application August 26, 1950, Serial No. 181,695

9 Claims. (Cl. 260—505)

The present invention relates to preparation of sulphonation products, including sulphonates having a very low content of inorganic salts, especially sulphonated hydrocarbons and derivatives thereof which are substantially free of or contain only very small quantities of diluent material, for example, salts of organic or inorganic bases.

In typical preparation of sulphonates, hydrocarbons or mixtures of hydrocarbons comprising aromatic substituents, for example, an alkylaromatic of which the alkyl substituent contains 10 or more carbon atoms, is subjected at sulphonating conditions to the action of a suitable sulphonating agent, commonly sulphuric acid. The resulting sulphonation mixture which comprises one or more alkylaromatic sulphonic acids is subsequently neutralized with an appropriate organic or inorganic base to form a mixture of the corresponding sulphonates of such base. Generally the sulphonate product is a mixture in which the cations may be of alkali metal (including ammonium) and are commonly of sodium.

If the aforementioned mixture containing sulphonic acids were neutralized without intervening purifying treatment to remove spent sulphonating acid, the resulting neutralized product would be liberally diluted with salts formed by the sulphonating acid and the neutralizing base, for example, alkali metal salts, which adversely affect the properties of the sulphonates for certain uses. Removal of such salts from the sulphonate being difficult and costly, it has been proposed to effect separation of unreacted sulphonating acid from the sulphonation product before its neutralization, so that the neutralized product contains reduced quantities of the undesired diluent salts. Several methods have been proposed for effecting the above-described separation, but in practice, these methods, although yielding a product acceptable for some uses, have left in the product a concentration of the undesired diluents, such as alkali metal salts, which is excessive for other uses so that further removal of such salts is highly desirable. One method which has been used successfully to effect reduction of the content of sulphonating acid in sulphonation mixtures is described in United States Patent No. 2,283,498 to Lawrence H. Flett. According to this method, a sulphonation mixture, for example, of alkylaromatic sulphonic acid mixed with unreacted sulphuric acid, is diluted with water; the aqueous mass is stratified into two layers or phases of different densities; and thereafter the lower or more dense layer containing the major portion of the sulfuric acid is withdrawn. The less dense or sulphonic acid layer upon neutralization and drying, has yielded a sulphonate detergent, which, although sufficiently low in content of alkali metal salts for some purposes, still contains greater quantities of the same than desired for other uses.

It is an object of the present invention to prepare sulphonates having the highly desirable properties reflected by a very low content of, and even substantial freedom from salts produced by the neutralizing base and the sulphonating agent.

In accordance with the present invention, a sulphonation product containing unseparated sulphonating agent is mixed with a controlled quantity of water-soluble polyhydric aclohol, whereupon the sulphonation product becomes readily divisible into relatively dense and relatively less dense liquid phases, one densest phase containing substantially all of the sulphonating acid component and the bulk of the polyhydric alcohol. The phases readily separate upon allowing the mixture to stand for a suitable period. Upon its separation from the more dense layer, the less dense or upper layer, upon neutralization with a suitable base, for example caustic soda, yields a sulphonate product which contains very small quantities of salts of the base. Typically the neutralized product (which has preferably been freed of unreacted hydrocarbons as hereinafter described) contains less than 10% by weight and even 5% or less of diluent salt, as down to 3% or even less of diluent salt. It is apparent from the low quantities of alkali metal salt that the products resulting from practice of this invention exhibit excellent solubility in water and dispersing, wetting and emulsifying properties.

In practice of the invention, the treatment with water-soluble polyhydric alcohol may be effected in conjunction with or as an adjunct to water dilution of the sulphonic acid-sulphonating acid mixture. Although the diluting water may be added to the sulphonation mass before or with the addition of the polyhydric alcohol, it is preferred that the water dilution, when used, precede the addition of polyhydric alcohol as will hereinafter be described in more detail. Use of suitable quantities of water for such purpose permits economy in the quantity of polyhydric alcohol necessary to achieve a predetermined purity of sulphonate in the final neutralized product.

The amount of water-soluble polyhydric alcohol employed must be such that upon its mixture with the sulphonic acid-sulphonating agent mixture the latter will be separable into distinct relatively more dense and relatively less dense components, the one concentrated in sulphonic acid components and the other concentrated in sulphonating agent and polyhydric alcohol. Quantities either too large or too small result in failure to achieve such separation. The specific amount in each instance will vary with the specific nature of the sulphonic acid or acids and the identity of the water-soluble polyhydric alcohol used. However, in all instances that quantity is minor with respect to the amount of sulphonic acid present, and, generally speaking, is 25% or less by weight of that amount.

Although excellent results are obtained with water-soluble polyhydric alcohols containing 3 or more hydroxyl groups, it is preferred to employ compounds of the glycol family. Generally speaking, for a given sulphonic acid mixture, smaller amounts of the glycols are necessary to effect a predetermined purification by removal of sulphonating agent to, say, 95% or greater content of sulphonate in the ultimate neutralized product than is the case with alcohols containing more than 2 hydroxyl groups. Within the glycol family the preferred members are those in which each of the alkylene radicals contains 4 carbon atoms or less, especially ethylene and propylene glycols.

During practice of the invention with a large number of different polyhydric alcohols, including the preferred class of glycols, it has been found that the highest degree of purity of final sulphonate product may be realized by use, for the purpose and in the manner described, of glycol ethers containing but a single ethereal oxygen atom, especially when such glycol ethers have alkylene radicals of no more than 3 carbon atoms. An exemplary and preferred member of this preferred group is diethylene glycol.

Typical of the sulphonic acid products to which the invention finds valuable application, are those obtained by sulphonation of alkyl aromatic hydrocarbons in each of which at least one alkyl substituent contains from 10 to 20 carbon atoms, for example, alkyl aromatic produced by condensing with an aromatic compound, a derivative, for example an olefine mixture or a chlorinated hydrocarbon mixture, of an essentially aliphatic non-aromatic hydrocarbon distillate boiling within the approximate range of 180° C. to 300° C. One method for producing such sulphonic products is disclosed in the above-mentioned United States Patent No. 2,233,408, and, for the sake of simplicity, the present invention will be described further in connection with the production of alkylaromatic sulphonates. Such application of the invention, however, is but illustrative and is not limitative of its scope. In the production of such alkylaromatics for sulphonation, a suitable naturally-occurring or synthetically-prepared non-aromatic hydrocarbon, for example, a distillate of Pennsylvania petroleum containing hydrocarbons of from 12 to 16 carbon atoms, in alkylatable form (as alkyl halide or as unsaturated hydrocarbons or both) may be reacted with the selected aromatic compound, for example benzene, under alkylating conditions and in the presence of a condensing agent of the Friedel-Crafts type.

The resulting alkylate may then be reacted with the sulphonating agent, for example sulphuric acid, to produce a mixture of sulphonic acids (of the alkyl benzenes) and unreacted sulphuric acid. A mixture of this type or other sulphonating mixture containing aromatic sulphonic acid and sulphuric acid may be used directly in practice of the present invention. However, it is preferred first to refine the alkyl benzene mixture to remove undesired hydrocarbons that may be present therein. Such removal may be by distillation in one or more steps, at conditions to effect removal of components both lower boiling and higher boiling than the desired alkylate. One method which effects refining of the alkyl benzene mixture by removal of both lower and higher boiling components is disclosed in the United States copending application Serial No. 793,862, filed December 26, 1947, now United States Patent No. 2,525,024.

Although the invention may be practiced by mixing with the refined sulphonation mass a minor quantity of water-soluble polyhydric alcohol, it is highly desirable first to effect partial separation of the sulphonating agent from the mass. Such separation may be done in accordance with the method disclosed in the aforesaid United States Patent No. 2,233,408. For example, the mass resulting from treatment of the alkylaromatic hydrocarbons with sulphuric acid (say 100% $H_2SO_4$) and containing unreacted hydrocarbons, alkylaromatic sulphonic acids and unreacted sulphuric acid may be diluted with a predetermined quantity of water and/or ice. With proper selection of the quantity of water the mass upon then being allowed to stand quiescent will, in due course, separate into two and often three layers; the uppermost layer (if there are three layers) comprising unreacted hydrocarbons, the central layer (or the uppermost of two layers) comprising the desired sulphonic acids together with some sulphuric acid, and the lowermost layer comprising the bulk of the sulphuric acid. The sulphonic acid and sulphuric acid layers contain water in addition to the compounds mentioned. The quantity of water selected for the above-mentioned dilution is preferably such that the lower layer comprises sulphuric acid of about 40–50% concentration. In the dilution and settling steps indirect cooling should be employed or part or all of the dilution water should be ice so as to maintain the mass during these steps at temperatures of about 60° C. or lower.

After removal as by decantation of the lowermost layers (and of the uppermost layer if three layers are formed), the remaining mass which contains the desired sulphonic acids and a small proportionate quantity of sulphuric acid, together with some water, may then be mixed with water-soluble polyhydric alcohol in accordance with a preferred aspect of the invention. The resulting mixture upon standing quiescent a suitable time (for example, an hour or more) separates into supernatent and lower layers of differing densities, the lower layer containing substantially all of the sulfuric acid and the polyhydric alcohol and the upper layer containing alkylaromatic sulphonic acids and but little if any sulphuric acid. After separation of these two layers as by decantation, the upper layer, when neutralized with a suitable inorganic or organic base, produces a final product which in dried form is a sulphonate having desired properties closely approaching those of chemically pure sulphonates because of their very low content of salts of the neutralizing base.

The invention will be illustrated by the following specific examples. It will be realized by those skilled in the art that the invention is not limited thereto except as indicated in the appended claims. The parts indicated are by weight, temperatures are in degrees centigrade, and pressure is atmospheric unless otherwise noted.

EXAMPLE 1

A Pennsylvania petroleum distillate having characteristics as follows; approximately boiling range of 180 to 300° and specific gravity of 0.79 at 25°, which distillate consisted primarily of aliphatic hydrocarbons having and average molecular carbon content of 13 to 14 carbon atoms (the range being from 10 to 17 carbon atoms per molecule), was chlorinated with gaseous chlorine in the presence of a small amount of iodine as catalyst at temperature of about 55 to 60° until the liquid had undergone an increase of specific gravity of about 0.125.

The resulting chlorinated mixture was reacted (for approximately two hours, while agitated, at a temperature of about 45°) with benzene in the presence of anhydrous aluminum chloride as catalyst in the weight ratio of about 10:6:0.8 parts by weight of chlorinated product, benzene and aluminum chloride, respectively. After the reaction was discontinued the reaction mixture was allowed to stand quiescent for about another two hours, whereupon it separated into two layers, the upper layer containing the desired alkyl benzenes together with benzene and other hydrocarbons in chlorinated and unchlorinated form. This upper layer was then distilled to remove from it constituents distilling at about 240° at a pressure of twenty mm. of mercury.

150 parts of the remaining distilland composed essentially of mixed alkylaromatics was purified by washing during agitation for about thirty minutes with 27.6 parts of 100% sulphuric acid and then withdrawing the acid used for washing. The purified material remaining was sulphonated by agitation for about an hour with 182.2 parts 100% sulphuric acid while maintaining the agitated mixture at 55–60°. The reaction mixture was then allowed to stand for about fifteen minutes, whereupon it separated into an upper layer comprising mixed alkyl benzene sulphonic acids and a lower layer concentrated in spent sulphuric acid.

The last-named layer (approximately 90 parts) was withdrawn. Then, during a period of about fifteen minutes, 16 parts of diethylene glycol were added to the mixed alkylbenzene sulphonic acids while the mixture was being agitated and maintained at temperature not in excess of 60°. Thereafter the mixture was allowed to stand quiescent whereupon it divided into upper and lower relatively less dense and relatively more dense layers, the lower layer containing 71.5 parts of spent acid and diethylene glycol being drawn off. The remaining mass of liquid was diluted with 450 parts of water (150 parts being ice) and neutralized (as indicated by grass green color of Nitrazine Yellow paper) with 44.8 parts of 50% aqueous caustic soda being employed for this step. After further dilution with water to a total volume equivalent to 725 volumes of water, the neutralized product was dried and analyzed for content of sodium sulphate. The analysis showed only 5% of this salt.

Upon repetition of the procedure described in the foregoing portion of this example, except that in place of adding diethylene glycol, 12 parts of water were added in accordance with the process of the aforementioned United States Patent 2,233,408, the final dried sulphonated product contained double the quantity of sodium sulphate, or 10%. In addition, the yield of organic sulphonate realized from the procedure using diethylene glycol was somewhat greater than that obtained from the water addition procedure.

EXAMPLE 2

150 parts of mixed higher alkyl benzenes obtained substantially as described in Example 1 were purified with sulphuric acid and sulphonated with sulphuric acid, substantially as described in that example. The resulting sulphonation mixture, after being allowed to stratify for about fifteen minutes, separated into an upper layer of sulphonic acids and a lower layer of spent sulphuric acid, which latter, upon being withdrawn, totaled 91 parts.

To the remaining mixture, which contained substantially all of the sulphonic acids, there was added 30.2 parts of glycerine during stirring and over a period of about twenty minutes while temperature of the mixture was maintained at not above about 60°. The resulting mixture containing glycerine, after being stratified for fifty minutes, was in the form of a two layer system. The lower layer comprising 98 parts of spent sulphuric acid and glycerine was withdrawn. Upon neutralization of the remaining mixture of sulphonic acids with 49.5 parts of 50% aqueous caustic soda, and drying of the resulting sulphonate solution, there was obtained a dry product containing only about 5.6% of sodium sulphate.

Upon repetition of the procedure described immediately above, with the exception that in place of glycerine 21 parts of water were used after the manner described in the last paragraph of Example 1, a dried sulphonate product was obtained containing more than 12% sodium sulphate.

EXAMPLE 3

A refined mixed alkyl benzene was produced in the following manner:

A. A total kerosene fraction comprising (1) a major quantity of virgin Pennsylvania kerosene boiling from about 190° to 255°, having a specific gravity of 0.786 at 24°, containing 12–13% aromatic and unsaturates, an aniline point of 71.6° and (2) a minor portion of kerosene recovered from a previous condensation by the distillation steps described in paragraph C hereof, was chlorinated directly at about 70° with gaseous chlorine until the chlorinated product had specific gravity at 24° of 0.917.

B. The resulting chlorinated product was reacted in the presence of anhydrous aluminum chloride, with a total benzene fraction comprising (1) fresh benzene and (2) benzene returned also from the distillation steps described in paragraph C hereof. The weight proportions of chlorinated kerosene, anhydrous aluminum chloride and total benzene were 1:0.045:1.9 respectively. After reaction for approximately an hour during which reaction temperature was brought to 50° the reaction mixture was allowed to stratify into an upper oily layer and a lower tarry layer. The latter comprising the aluminum chloride residue was rejected.

C. The upper oily layer produced in accordance with paragraph B hereof was subjected to flash vaporization at 120–130° and the distilland resulting therefrom was subjected to further "stripping," i. e. distillation, at about 10 inches of mercury absolute pressure, until the aniline point of the distillate rose to 50°. The distillates from the flash vaporization and "stripping" were commingled for reuse as a portion of the benzene starting material in steps described in paragraph B hereof. Thereafter, the distillation was continued at absolute pressure of 1 to 2 inches of mercury until the aniline point of the still contents dropped to 25.5–26°. The distillate from this step was returned for reuse as recovered kerosene in steps described in paragraph A hereof. The third distilland (or remaining crude alkyl benzene mixture) then had high boiling impurities removed therefrom by continuous distillation effected at absolute pressure of about 6 mm. of mercury in a heated distillation vessel the walls and bottom of which were maintained at approximately 250°. The rate of flow of the aforesaid distilland to and through the vessel was so controlled that the residence time of vapors within the distillation zone was of the order of 1.2 seconds. The aforesaid high boiling impurities were continuously withdrawn from the distillation vessel as residue, and the desired refined alkyl benzene recovered by condensation of the distillate from that vessel.

800 parts of the refined alkyl benzene obtained as described above was subjected to further purification with 100% sulphuric acid after the manner described in Example 1, and the resulting purified material was sulphonated by agitation for an hour with 1,133.4 parts of 100% sulphuric acid at 55 to 60°. The reaction mixture was then allowed to stand and the lower layer of spent acid which formed was withdrawn and discarded.

The remaining upper layer comprising mixed alkyl benzene sulphonic acids was divided into portions, each weighing 80.5 parts and containing the mixed sulphonic acids derived from 50 parts of kerylbenzene. Each portion was then mixed with a water-soluble polyhydric alcohol and the mixtures so obtained were allowed to stand until separations of them into upper and lower layers of relatively low and relatively high density were completed. After withdrawal of the lower layers thus formed, the upper layers of alkylaromatic sulphonic acids were neutralized with caustic soda substantially after the manner described in Example 1, and the resulting sulphonates were dried. The contents of sodium sulphate in each of the dried products thus obtained were then determined. The nature and quantity of polyhydric alcohols used and the sodium sulphate content of the dried products are indicated in the following table:

*Water soluble polyhydric alcohol*

| Identity | Weight Percent of Sulphonic Acid Present | Percent Sodium Sulphate in Dried Sulphonates |
| --- | --- | --- |
| Diethylene Glycol | 5 | 14.7 |
| Do | 10 | 9.6 |
| Do | 16 | 6.6 |
| Do | 20 | 6.2 |
| Diethylene Glycol, as 50% water solution | ¹ 5 | 10.5 |
| Glycerine | 10 | 12.3 |
| Propylene Glycol (1, 2) | 10 | 11.7 |
| Triethylene Glycol | 10 | 11.0 |

¹ Excluding the water.

EXAMPLE 4

Another 800 parts of refined alkyl benzene, prepared, acid-washed and sulphonated in accordance with the procedure described in Example 3, was mixed with 80 parts of water and thereafter allowed to stratify into separate layers of spent sulphuric acid and sulphonic acids. The sulphonic acid layer, after withdrawal of the sulphuric acid layer, was divided into several portions each weighing 66.5 parts and containing the mixed alkylaromatic sulphonic acids derived from 50 parts of keryl benzene. With each such portion, there was mixed a predetermined quantity of either diethylene glycol or water. The resulting mixture in each case was allowed to stratify and the lower of the resulting layers comprising most of the sulphuric acid, was withdrawn. The remaining layer of sulphonic acids was neutralized substantially in accordance with the procedure disclosed in Example 1, and, after drying, the neutralized product was analysed for content of sodium sulphate.

The results of the foregoing are summarized in the following table:

| Material Added, Weight Percent of Sulphonic Acids Present | Percent Sodium Sulphate in Dried Sulphonates |
| --- | --- |
| Diethylene Glycol: | |
| 4 | 6.7 |
| 10 | 5.0 |
| 14 | 5.7 |
| Water: | |
| 4 | 13.4 |
| 10 | 14.8 |
| 14 | 16.9 |

When the procedure of this Example 4, was repeated with the single change that instead of 80 parts water, 160 parts water were added, no stratification of the mixture occurred following use of water or of 10% of diethylene glycol. Following the addition of 2% and 4% of diethylene glycol, however, there was stratification and the resulting final dried neutralized products contained 9.2% and 8.9%, respectively, of sodium sulphate.

EXAMPLE 5

A sulphonation product comprising mixed alkylaromatic sulphonic acids and sulphuric acid was prepared from 1600 parts of alkylbenzene which were acid washed and sulfonated substantially in the manner described in Example 3. The resulting mass was divided into two equal portions, A and B.

With two of three equal parts of portion A, each equivalent to 50 parts of mixed alkylaromatic sulphonic acids, there was mixed a different amount of ethylene glycol, and the lower layer formed after allowing the mixture to stratify was withdrawn. The remaining upper layer of each part so treated, and the third part, was separately neutralized with caustic soda solution and dried as described in Example 1, and the neutralized products were analyzed for sodium sulphate.

Portion B was mixed with 80 parts of water, the mixture so obtained was allowed to stratify into upper and lower layers, and the lower layer was withdrawn from the system substantially as described in Example 4. Two equal parts of the mixture which comprised the upper layer were mixed with different and smaller quantities of ethylene glycol and the mixture subjected to stratification, neutralization of the resulting upper layer, and drying and analysis substantially in the manner described in Example 1.

The quantity of ethylene glycol used in the above described treatments, together with the indicated content of sodium sulphate in the several final products obtained are summarized in the following table:

| Quantity of Ethylene Glycol Added, percent by weight of Sulphonic Acids Present | Sodium Sulphate, percent by weight of Dry Sulphonates |
| --- | --- |
| Portion A: | |
| 20 | 4 |
| 24.6 | 3.3 |
| None | 40 |
| Portion B: | |
| 6 | 3.6 |
| 9.4 | 3.4 |

The foregoing specific examples reflect relative effects in practice of the invention of several water-soluble polyhydric alcohols and of different quantities of water-soluble polyhydric alcohols as applied to certain mixtures of alkylaromatic sulphonic acids and sulphonating agent. It will be understood by persons skilled in the art that the specific degree of response of sulphonic acid-sulphonating agent mixtures to water-soluble polyhydric alcohols and to different quantities of such an alcohol will vary somewhat depending upon, among other things, the source and specific nature of the sulphonic acid or acids present in the mixture. It is but a matter of simple experimentation with a given sulphonic acid-sulphonating agent mixture which it is desired to purify in accordance with the invention, to determine the nature and quantity of water-soluble polyhydric alcohol which will effect the desired or maximum separation of sulphonating agent.

Referring more specifically to the quantity of water-soluble polyhydric alcohol which may be employed in the practice of the invention, the specific examples referred to above show that often a very high degree of purity of sulphonic acid or of final sulphonate product may be realized when the quantity of such alcohol used is 10% or even 5% or less by weight of sulphonic acid contained in the mixture under treatment. A very high degree of purity may be obtained with 15% of water-soluble polyhydric alcohols of the preferred types or classes, even when they are used alone; that is, in the absence of water.

Examples 3, 4, and 5 reflect certain important advantages accruing to practice of certain aspects of the invention involving the use of water in conjunction with polyhydric alcohol to effect the desired purification. The specific examples illustrate two procedures which may be followed for the use of water, namely, (1) by its addition to the acid mixture simultaneously with the alcohol, for example, by using a solution of the selected water-soluble polyhydric alcohol in water (see line 5 of the table in Example 3), and (2) by separate additions of water and water-soluble polyhydric alcohols, respectively. The last named method (illustrated in Examples 4 and 5) may be and preferably is employed, for reasons of economy of water-soluble polyhydric alcohol and nicety of control over the quality of the final product, in accordance with the procedure detailed in the examples; that is, by first adding to the acid mixture a suitable quantity of water, separating from the mixture the portion of the sulphonating agent thus made separable therefrom, and then adding the water-soluble polyhydric alcohol.

The specific examples demonstrate that the use of water, even in relatively small quantities, in conjunction with the selected water-soluble polyhydric alcohol is markedly effective in assisting the alcohol to achieve a final product of higher purity than would be obtained if the water were omitted. Obviously the advantages of the use of water may also be reflected in the requirements of a lower quantity of polyhydric alcohol necessary, if used alone, to achieve a given purity of final product.

Although the advantages in practice of the invention of the use of water in suitable quantities are very pronounced, such advantages may disappear wholly or in part if excessive quantities of water are employed. Generally speaking, the quantity of water which will assist to substantial extent the separation made possible by the water-soluble polyhydric alcohol, is less than 15% by weight of the total sulphonic acids being subjected to purification. The best results in terms of economy, purity of final product, or both, are usually realized when the amount of water is 10% or less by weight of those acids.

It is preferred that the temperature of the system be maintained within the range of 50° C. to 80° C. during the step of mixing water-soluble polyhydric alcohol with the mixed acids, and during the subsequent separation step. Within this range of temperature, the system being treated usually possesses fluidity and other characteristics favoring rapid mixing and separating action, and results in a final product of light color. However, other temperatures at which the desired characteristics are present may be employed.

The invention has been described in detail as applied to sulphonation products comprised of alkylaromatic sulphonic acids, of which the alkyl substituents contain 10 or more carbon atoms. It is to be understood that these alkyl substituents may exist in the sulphonic acid as straight or branched chain aliphatic or araliphatic groups and/or as non-benzenoid rings which may or may not be fused to the aromatic nucleus. The invention applies in its broad aspects to sulphonate mixtures composed of other sulphonic acids, including alkylaromatics having different substituent groups, such as straight chain or other aliphatics containing a smaller number of carbon atoms derived from petroleum or other sources, for example alcohols, or olefines including polymers. The aromatic substituent of the sulphonic acids may be benzene, as illustrated. It may contain as substituents one or more of the following: halogen, a hydroxyl group, an ether group (in which the hydrocarbon radical of the ether is an alkyl or aralkyl group containing 1 to 8 carbon atoms, or an aryl radical), or a carboxyl group (in the free acid or salt form). Examples of such aromatic compounds are: benzene, naphthalene, anthracene, diphenyl, and their homologues (such as, toluene, xylene, etc.); monochlorbenzene, phenol, cresols, naphthol, anisole, phenetol, benzoic acid, salicylic acid, resorcinol, and hydroxy diphenyl. Mixtures of aromatic compounds may be employed if desired; as for example, naturally-occurring mixtures (such as, commercial cresylic acid), or artificially prepared mixtures of two or more of the aromatic compounds. Unsubstituted lower aromatic hydrocarbons are preferred, since they can be readily removed from the higher alkyl derivatives by vaporization and they are less affected by side reactions.

The sulphonation of the mixture of alkylaromatic compounds may be carried out with any suitable agent; as for example, sulphuric acids of various strengths (66° Bé., 100%, 26% oleum, 65% oleum, etc.), chlorsulphonic acid, sulphur trioxide, etc.

The salts of the alkylated aromatic sulphonic acids may be dried in any suitable manner. They are preferably dried on atmospheric or vacuum drum driers or in spray driers. Preferably the sulphonates derived from organic bases are dried under vacuum conditions.

I claim:

1. In the production of alkylaromatic sulphonic acids, the steps comprising reacting an alkylaromatic hydrocarbon containing from 10 to 20 carbon atoms in the alkyl group with a sulphonating agent to produce a liquid product comprising alkylaromatic sulphonic acid and sulphonating agent in admixture, subsequently mixing such admixed sulphonic acid and sulphonating agent with a water-soluble polyhydric alcohol in quantity no greater than about 25% by weight with respect to the quantity of alkylaromatic sulphonic acid present but such as to produce a system separable into masses of differing densities, one of said masses comprising alkylaromatic sulphonic acid and another comprising the bulk of the polyhydric alcohol and substantially all of the sulphonating agent present in the aforesaid product, effecting such separation, and withdrawing the last-named mass from the system.

2. In the production of alkylaromatic sulphonates, the steps comprising subjecting a sulphonated hydrocarbon fraction comprising alkylaromatic sulphonic acid containing from 10 to 20 carbon atoms in the alkyl group and sulphuric acid to treatment with a water-soluble alkylene polyhydric alcohol, wherein each alkylene group contains no more than 4 carbon atoms, the quantity of alcohol used being no greater than about 25% by weight with respect to the quantity of sulphonic acid present but such as to produce a mixture separable into two immiscible liquids of differing densities, one comprising polyhydric alcohol and sulphuric acid and the other comprising sulphonic acid relatively free of sulphuric acid, effecting such separation, thereafter separating the two immiscible liquids from one another, neutralizing the liquid comprising sulphonic acid with a base, and drying the neutralized product to yield a dry sulphonate detergent of very low content of sulphates.

3. In the production of alkylaromatic sulphonates, the steps comprising subjecting a hydrocarbon fraction comprising alkylaromatic hydrocarbons containing from 10 to 20 carbon atoms in the alkyl groups to sulphonation with sulphuric acid, subsequently mixing the sulphonic acid so produced and while containing unreacted sulphuric acid with an alkylene glycol, wherein each alkylene group contains no more than 4 carbon atoms, the quantity of glycol used being no greater than 25% by weight of sulphonic acid present but such as to render the resulting mixture separable into immiscible liquids of differing densities, one comprising sulphuric acid and the bulk of the glycol and the other comprising sulphonic acid relatively free of sulphuric acid, effecting such separation, and separating the resulting immiscible liquids from one another, neutralizing that separated liquid comprising sulphonic acid with an inorganic base, and drying the neutralized product to yield a dry sulphonate relatively free of sulphates of said base.

4. In the production of alkylaromatic sulphonates, the steps comprising subjecting a hydrocarbon fraction comprising alkylaromatic hydrocarbons containing from 10 to 20 carbon atoms in the alkyl groups to sulphonation with sulphuric acid, subsequently mixing the sulphonic acid so produced while mixed with unreacted sulphuric acid with an alkylene glycol ether, each alkylene group of which contains no more than 3 carbon atoms and which contains but one ethereal oxygen in addition to the oxygen contained in the hydroxy groups thereof, the quantity of said glycol ether being no greater than 20% by weight of sulphonic acid present but such as to render the resulting mixture separable into immiscible liquids of differing densities, one comprising sulphuric acid and glycol ether and the other comprising sulphonic acid relatively free of sulphuric acid, effecting such separation, and separating said immiscible liquids from one another, neutralizing that separated liquid comprising sulphonic acid with an inorganic base, and drying the neutralized product to yield a dry sulphonate substantially free of sulphates.

5. The process according to claim 4 wherein the alkylene glycol ether employed is diethylene glycol.

6. In the production of alkylaromatic sulphonates, the steps comprising reacting an alkylaromatic hydrocarbon containing from 10 to 20 carbon atoms in the alkyl group with a sulphonating agent to produce a liquid product comprising alkylaromatic sulphonic acid and unreacted sulphonating agent in admixture, diluting the aforesaid mixture with water in such quantity that the diluted mixture is separable into liquid phases of differing densities, one phase being concentrated in alkylaromatic sulphonic acid and the other in sulphonating agent, forming such phases and separating them from one another, mixing with the phase concentrated in sulphonic acid a quantity of water-soluble polyhydric alcohol no greater than about 25% by weight with respect to its content of sulphonic acid but such as to render the resulting mixture separable into immiscible liquid phases of differing densities, one phase being concentrated in sulphonic acid and the other in sulphonating agent and polyhydric alcohol, forming said last-named liquid phases and separating them from one another, neutralizing the sulphonic acid concentrate resulting from the last-named separation with a base to form a sulphonate product, and drying said product.

7. In the processing of sulphonic acid-containing mixtures produced by reaction with excess sulphonating agent of a hydrocarbon fraction comprising one or more alkylaromatic hydrocarbons containing from 10 to 20 carbon atoms in the alkyl groups to prepare a product substantially free of constituents of such agent, the steps comprising adding to and mixing with such a mixture water and a water-soluble polyhydric alcohol, the quantity of the latter being no greater than about 25% by weight with respect to the quantity of sulphonic acid present but such as to produce a liquid phase system separable into water-containing liquid phases of differing densities, a comparatively light phase containing substantially all of said sulphonic acid and a comparatively heavy phase containing substantially all of said sulphonating agent and the bulk of said water-soluble polyhydric alcohol, effecting separation of said system into the aforesaid comparatively heavy and comparatively light liquid phases, and withdrawing said comparatively heavy phase from the system to leave said comparatively light phase relatively free of said sulphonating agent and capable of neutralizing directly to yield a sulphonate product relatively free of constituents of said agent.

8. In the preparation of alkali metal sulphonates substantially free of inorganic salts, the steps comprising producing a sulphonation product which is a mixture of alkylaromatic sulphonic acids of which the aromatic substituent is benzene and the alkyl substituents contain between 10 and 20 carbon atoms and sulphuric acid, mixing with said mixture water in quantity equal to no more than 15% by weight of said mixture but such as to produce a system separable into liquid phases of differing densities, allowing the resulting mixture containing water to stand quiescent until it separates into portions in the form of an upper layer comprising mixed alkylaromatic sulphonic acids and a lower layer comprising sulphuric acid, separating said layers from one another by decantation, mixing with the so separated portion comprising mixed alkylaromatic sulphonic acids an ethylene glycol in amount no more than 25% by weight of the sulphonic acids present but such as to produce a system separable into immiscible liquid phases of differing densities, allowing the ethylene glycol-containing mixture to remain quiescent until it separates into parts in the form of an upper layer consisting essentially of mixed alkylaromatic sulphonic acids and a lower layer containing the bulk of the ethylene glycol and substantially all of the sulphuric acid remaining in the aforesaid layer comprising mixed alkylaromatic sulphonic acids, separating the last-named layers from one another by decantation, neutralizing with a solution of an alkali metal base the aforesaid part consisting essentially of mixed alkylaromatic sulphonic acids, and drying the neutralized product.

9. In the preparation of alkali metal sulphonates substantially free of inorganic salts, the steps comprising producing a sulphonation product which is a mixture of alkyl-aromatic sulphonic acids of which the aromatic portion is benzene and the alkyl substituents contain between 10 and 20 carbon atoms and sulphuric acid, mixing with said mixture water in quantity equal to no more than 10% by weight of said mixture but such as to produce a system separable into liquid phases of differing densities, allowing the resulting mixture containing water to stand quiescent until it separates into portions in the form of an upper layer comprising mixed alkylaromatic sulphonic acids and a lower layer comprising sulphuric acid, separating said layers from one another by decantation, mixing with the so separated portion comprising mixed alkylaromatic sulphonic acids diethylene glycol in amount no more than 15% by weight of the sulphonic acids present but such as to produce a system separable into immiscible liquid phases of differing densities, allowing the diethylene glycol-containing mixture to remain quiescent until it separates into parts in the form of an upper layer consisting essentially of mixed alkylaromatic sulphonic acids and a lower layer containing the bulk of the diethylene glycol and substantially all of the sulphuric acid remaining in the aforesaid layer comprising mixed alkylaromatic sulphonic acids, separating the last-named layers from one another by decantation, neutralizing with a solution of caustic soda the aforesaid part consisting essentially of mixed alkylaromatic sulphonic acids, and drying the neutralized product.

ANDREW SHULTZ, Jr.

References Cited in the file of this patent

UNITED STATES PATENTS

| Number | Name | Date |
| --- | --- | --- |
| 2,158,680 | Retailliau | May 16, 1939 |
| 2,233,408 | Flett | Mar. 4, 1941 |
| 2,244,512 | Brandt | June 3, 1941 |
| 2,268,140 | Hengstenberg | Dec. 30, 1941 |
| 2,334,532 | Archibald | Nov. 16, 1943 |
| 2,406,763 | Griesinger | Sept. 3, 1946 |
| 2,467,170 | Weinmayr | Apr. 12, 1949 |